United States Patent
Dong et al.

(10) Patent No.: US 8,564,697 B2
(45) Date of Patent: Oct. 22, 2013

(54) BLACK LEVEL CALIBRATION METHOD AND SYSTEM

(75) Inventors: Nguyen Dong, Irvine, CA (US); Amit Mittra, Irvine, CA (US); Chi-Shao Lin, Irvine, CA (US)

(73) Assignee: Himax Imaging, Inc., Grand Cayman (KY)

(*) Notice: Subject to any disclaimer, the term of this patent is extended or adjusted under 35 U.S.C. 154(b) by 597 days.

(21) Appl. No.: 12/582,715

(22) Filed: Oct. 21, 2009

(65) Prior Publication Data

US 2011/0090238 A1    Apr. 21, 2011

(51) Int. Cl.
*H04N 9/64* (2006.01)
(52) U.S. Cl.
USPC .................................. 348/243; 348/187
(58) Field of Classification Search
USPC ................. 348/246, 245, 243.1, 243
See application file for complete search history.

(56) References Cited

U.S. PATENT DOCUMENTS

| | | | | |
|---|---|---|---|---|
| 6,940,548 B2* | 9/2005 | Ying et al. | ..... | 348/241 |
| 7,084,911 B1* | 8/2006 | Lee et al. | ..... | 348/243 |
| 7,259,787 B2* | 8/2007 | McDermott | ..... | 348/243 |
| 2009/0046180 A1* | 2/2009 | Shibano et al. | ..... | 348/243 |
| 2009/0109305 A1* | 4/2009 | Dai et al. | ..... | 348/245 |

* cited by examiner

*Primary Examiner* — Tuan Ho
*Assistant Examiner* — Fayez Bhuiyan
(74) *Attorney, Agent, or Firm* — SU IP Consulting

(57) ABSTRACT

Black level calibration methods and systems are generally disclosed. According to one embodiment of the present invention, a method of calibrating a black level signal in a frame includes performing an iteration of averaging a first set of digital values corresponding to a first set of adjusted black level signals associated with a first set of black pixels of the frame, determining whether an average value based on the first set of digital values has reached a target black level, determining a calibration offset based on a difference between the average value and the target black level and an accumulator step, converting the calibration offset to an analog signal, generating a calibration signal based on the analog signal for a second set of black pixels of the frame, and repeating the iteration for the frame until a predetermined condition is determined to have been met.

18 Claims, 6 Drawing Sheets

BLACK LEVEL CALIBRATION METHOD AND SYSTEM

BACKGROUND

1. Field of the Invention

The present invention generally relates to image processing, and more particularly to a black level calibration method and system.

2. Description of the Related Art

Unless otherwise indicated herein, the approaches described in this section are not prior art to the claims in this application and are not admitted to be prior art by inclusion in this section.

Image sensors such as CMOS or CCD sensors are made up of an array of individual pixels, each of which collects photons incident on the image sensor. The number of photons collected in each pixel is converted into an electrical charge by a photodiode and this charge is then converted into an analog voltage, which may be amplified, adjusted, and converted to a digital value by an analog-to-digital converter, so that the information obtained from the individual pixels can be processed, usually by a digital signal processor, into a final digital image.

Most image sensors require some form of calibration before use so that the data obtained from the image sensor can be used to produce digital images that faithfully reproduce the optical characteristics (e.g., intensity and color) of the scene or object whose image was captured. One type of calibration is referred to as black level calibration, which effectively sets a threshold below which digital data values obtained from the image sensor will be considered to represent a black level, or to represent the absence or substantial absence of light. Accurate black-level calibration helps to achieve a digital picture with full contrast and subtle details in dark shadow regions. If the black level is too low, information in dark areas may be lost. Conversely, if the black level is too high, signal range may be sacrificed.

In conventional systems, a border of an image-sensing array is surrounded with a number of rows and columns of light shielded, or black, pixels. These pixels provide black reference information or black pixel data to stabilize downstream image processing and establish the correct value for black in the output image.

Calibration purely in the digital domain reduces the range of the system and reduces image quality. On the other hand, to accomplish high resolution and a wide calibration range simultaneously in the analog domain, existing solutions often involve circuits with large size and high power consumption.

SUMMARY OF THE INVENTION

One embodiment of the present invention sets forth a method of calibrating a black level signal in a frame, which includes performing an iteration of averaging a first set of digital values corresponding to a first set of adjusted black level signals associated with a first set of black pixels of the frame, determining whether an average value based on the first set of digital values has reached a target black level, determining a calibration offset based on a difference between the average value and the target black level and an accumulator step, converting the calibration offset to an analog signal, generating a calibration signal based on the analog signal for a second set of black pixels of the frame, and repeating the iteration for the frame until a predetermined condition is determined to have been met.

At least one advantage of the present invention disclosed herein is to achieve high resolution and a wide calibration range for black level calibration in a power efficient manner.

BRIEF DESCRIPTION OF THE DRAWINGS

The foregoing and other features of the present invention will become more fully apparent from the following description and appended claims, taken in conjunction with the accompanying drawings. These drawings depict only several embodiments in accordance with the invention and are therefore not to be considered limiting of its scope. The invention will be described with additional specificity and detail through use of the accompanying drawings.

DETAILED DESCRIPTION

Various embodiments are described hereinafter with reference to the figures. It should be noted that the figures are not drawn to scale. It should also be noted that the figures are only intended to facilitate the description of embodiments. They are not intended as an exhaustive description of the present invention or as a limitation on the scope of the present invention. In addition, an aspect described in conjunction with a particular embodiment is not necessarily limited to that embodiment and can be practiced in any other embodiments.

Figure 1:
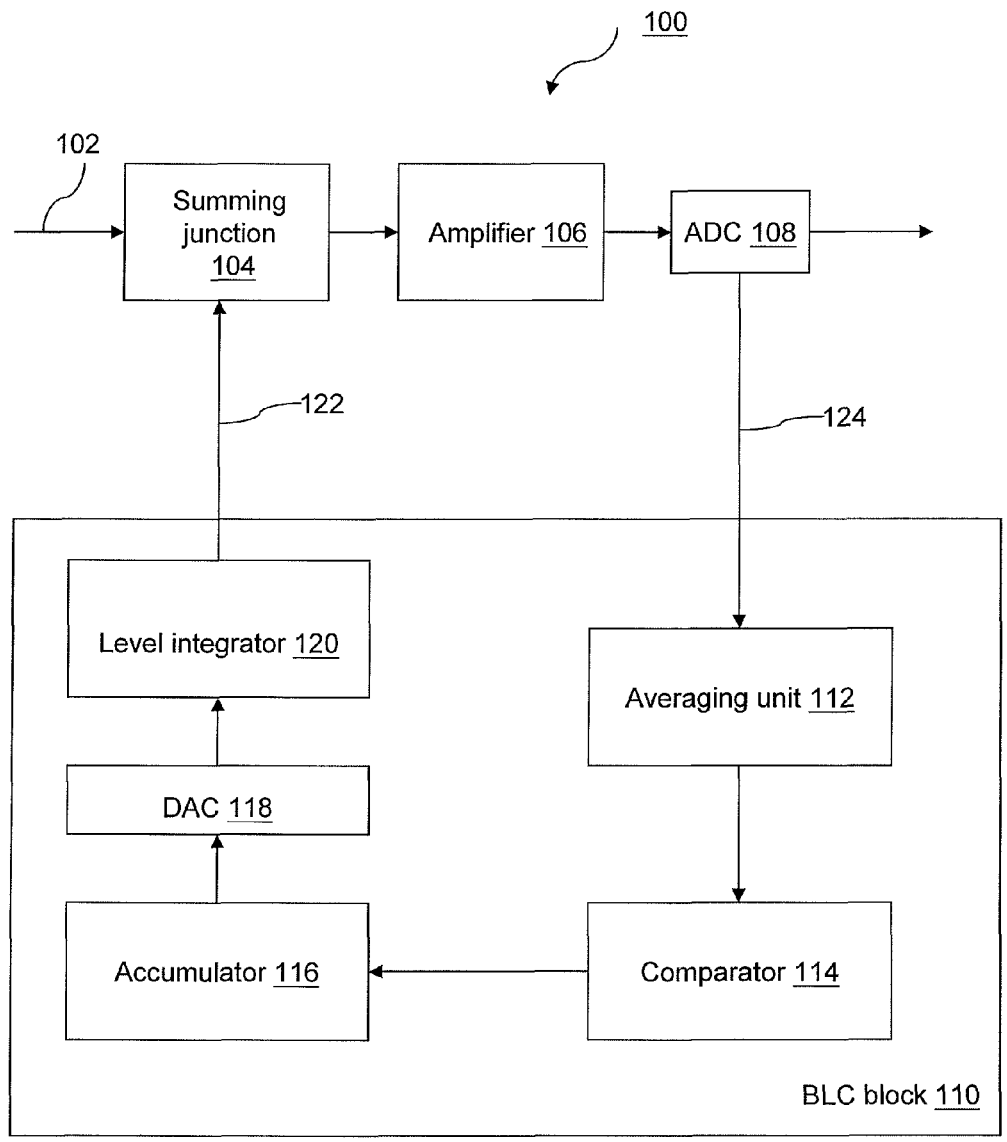
FIG. 1 is a simplified block diagram illustrating an example image processing system, according to one embodiment of the present invention.

FIG. 1 is a simplified block diagram illustrating an example image processing system 100, according to one embodiment of the present invention. The image processing system 100 includes a summing junction 104, an amplifier 106, an analog-to-digital converter (ADC) 108, and a black level calibration (BLC) block 110. The summing junction 104 is configured to receive a source signal 102, which may include a black level signal and/or an image signal. The black level signal is a read-out of an array of black level pixels, and the image signal is an output from an array of active pixels corresponding to a captured image.

The BLC block 110 is configured to adjust the received black level signal during a certain calibration period to generate a calibrated black level signal. In one implementation, the BLC block 110 includes an averaging unit 112, a comparator 114, an accumulation 116, a digital-to-analog converter (DAC) 118, and a level integrator 120.

In addition to receiving the source signal 102, the summing junction 104 is also configured to receive a calibration signal 122 from the BLC block 110. The summing junction 104 may adjust the source signal 102 with the calibration signal 122. The amplifier 106 is configured to further adjust the output of the summing junction 104 to better utilize the range supported by the ADC 108 and to reduce quantization noises. The ADC 108 is configured to output a digital signal 124 corresponding to the adjusted analog output signal from the amplifier 106.

The averaging unit 112 is configured to add and average the received digital signals 124 for different pixels and send the resulting averaged value to the comparator 114 for further processing. The accumulator 116 is configured to process the output of the comparator 114 and output a calibration offset. After having converted the calibration offset back to an analog signal by the DAC 118, the level integrator 120 is configured to prepare the calibration signal 122 based on the calibration offset. Additional details of the image processing system 100 will be further described in the following paragraphs.

Figure 2:
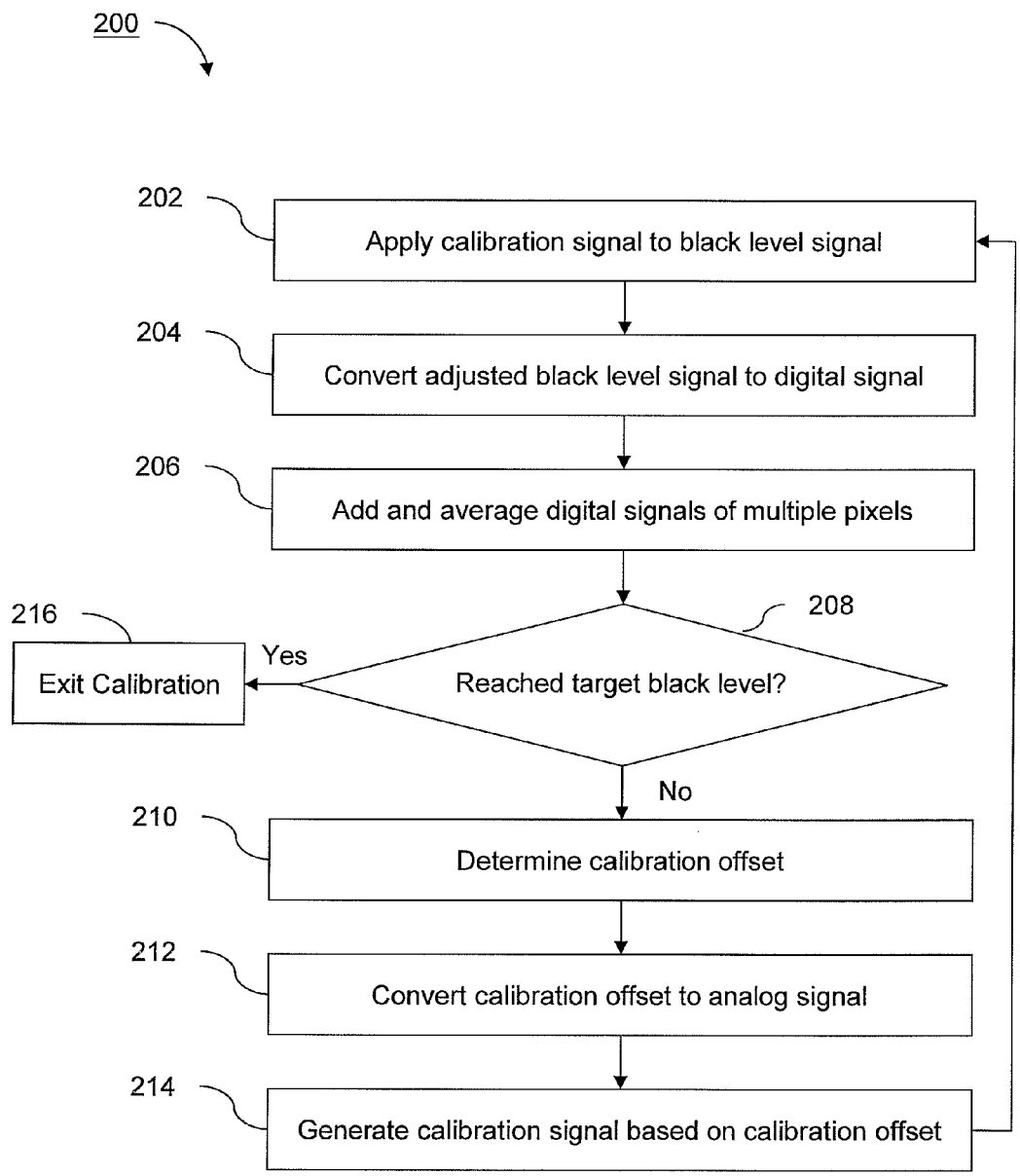
FIG. 2 is a flow chart illustrating a process for performing black level calibration, according to one embodiment of the present invention.

FIG. 2 is a flow chart illustrating a process 200 for performing black level calibration, according to one embodiment of the present invention. In one implementation, the process 200 may be carried out by the image processing system 100 shown in FIG. 1. During a black level calibration period in a frame, in operation 202, a calibration signal is applied to a black level signal in a source signal. The adjusted black level signal is converted to a digital signal in operation 204, and the digital signals of multiple pixels are added and averaged in operation 206. In operation 208, the averaged value is processed and compared to a target black level. If the target black level is determined to not to have been reached, then the averaged value is further processed in operation 210 to determine a calibration offset. The calibration offset is converted back to an analog signal in operation 212, and the analog signal is utilized to generate a calibration signal in operation 214. The calibration loop in the process 200 continues during the black level calibration period in the frame, until the target black level target is determined in operation 208 to have been reached. Then, the process 200 is configured to exit black level calibration in operation 216. The calibration signal is instead applied to the image signal of the source signal in the frame. In one implementation, the calibration loop in the process 200 may also exit the black level calibration period when the black pixels in the frame have been processed.

Figure 3A:
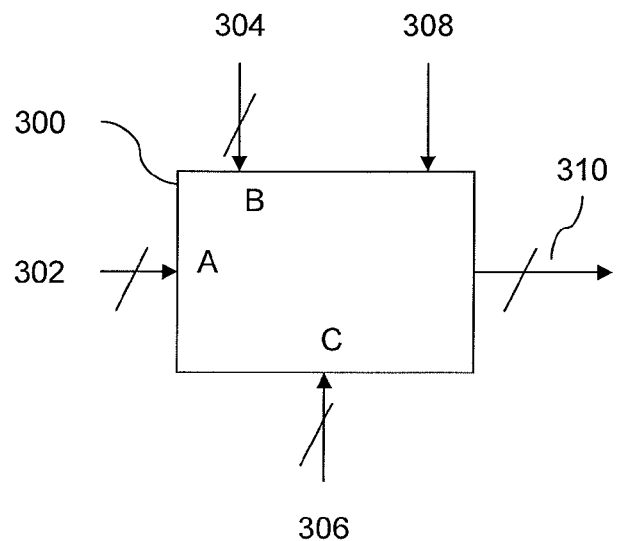
FIG. 3A is a schematic diagram illustrating an example comparator, according to one embodiment of the present invention.

FIG. 3A is a schematic diagram illustrating an example comparator 300, according to one embodiment of the present invention. In one implementation, the comparator 300 may correspond to the comparator 114 of FIG. 1 and is configured to perform some aspects of operation 208 shown in FIG. 2. The comparator 300 receives an input signal 302, a target black level 304, a black level ceiling 306, and a reset signal 308. The target black level 304 may be set during initialization and may be modified depending on different lighting conditions. The black level ceiling 306, which may be used to dampen the system response to potentially varying black levels, may be programmable and may be represented in 8 bits to reduce power consumption. In one implementation, the comparator 300 resets via the reset signal 308 when a new frame starts.

Figure 3B:
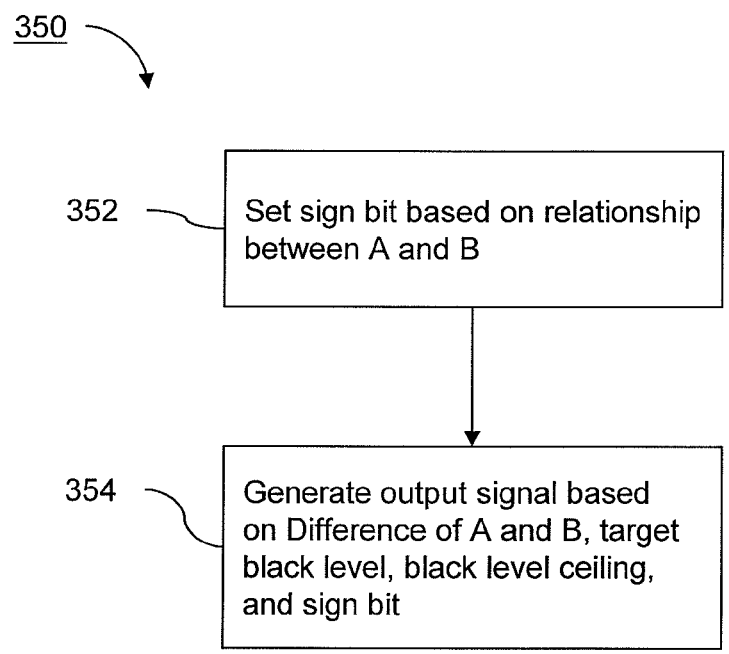
FIG. 3B is a flow chart illustrating a process performed by the comparator of FIG. 3A to generate an output signal, according to one embodiment of the present invention.

FIG. 3B is a flow chart illustrating a process 350 performed by the comparator 300 to generate an output signal 310, according to one embodiment of the present invention. For illustration, one example output signal 310 is represented by 9 bits and is also referred to as output_signal[8:0] in the following paragraphs. In operation 352, a sign bit is set based on the relationship between the input signal 302, which may correspond to the averaged digital value of multiple pixels, and the target black level 304. For example, if the input signal 302 is less than the target black level 304 (e.g., A<B), the sign bit may be set to 1 (i.e., output_signal[8]=1). Otherwise (e.g., A>=B), the sign bit may be set to 0 (i.e., output_signal[8]=0). In operation 354, the output signal 310 is generated based on the difference between the input signal 302 and the target black level 304, the black level ceiling 306, also the sign bit. For example, if the absolute difference between the input signal 302 and the target black level 304 is greater than the black level ceiling 306 (e.g., |A−B|>C), then the output signal 310 is the combination of the sign bit and the black level ceiling 306 (e.g., output_signal[8] corresponds to the sign bit, and output_signal[7:0] is represented by the black level ceiling 306). On the other hand, if the absolute difference between the input signal 302 and the target black level 304 is less than or equal to the black level ceiling 306 (e.g., |A−B|<=C), then the output signal 310 is the combination of the sign bit and the absolute difference.

Figure 4A:
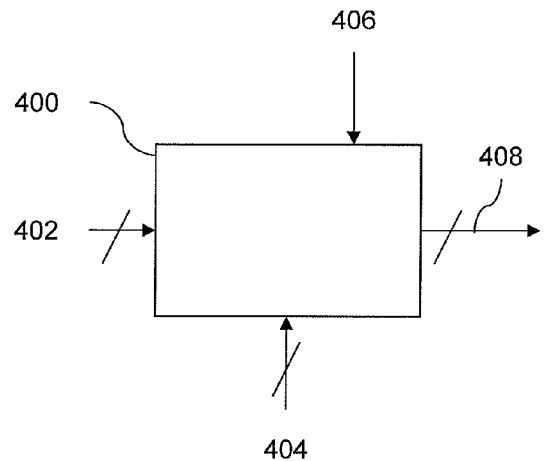
FIG. 4A is a schematic diagram illustrating an example accumulator, according to one embodiment of the present invention.

FIG. 4A is a schematic diagram illustrating an example accumulator 400, according to one embodiment of the present invention. In one implementation, the accumulator 400 may correspond to the accumulator 116 of FIG. 1 and is configured to perform some aspects of operation 208 and also operation 210 of FIG. 2. The accumulator 400 receives a black level value 402, an accumulator step 404, and a reset signal 406. In one implementation, the accumulator step 404 is a positive integer number, and the accumulator 400 resets via the reset signal 406 when a new frame starts.

Figure 4B:
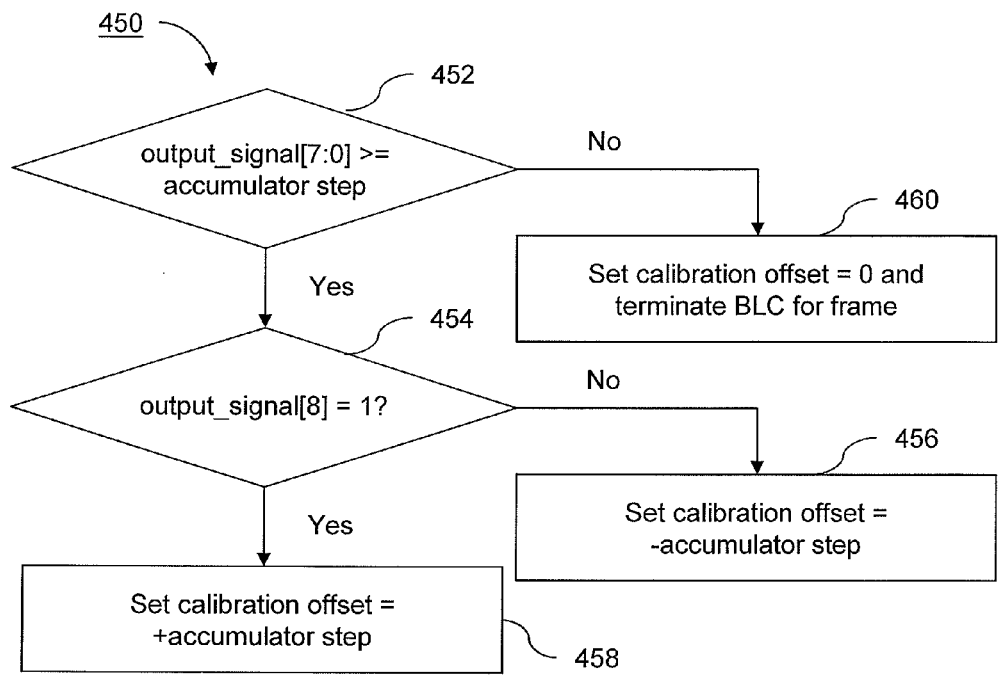
FIG. 4B is a flow chart illustrating a process performed by the accumulator of FIG. 4A to generate a calibration offset, according to one embodiment of the present invention.

FIG. 4B is a flow chart illustrating a process 450 performed by the accumulator 400 to generate a calibration offset 408, according to one embodiment of the present invention. In operation 452, if the output_signal[7:0] from a comparator, such as the comparator 114 of FIG. 1, is greater than or equal to the accumulator step 404, then the calibration offset 408 is generated based on the sign bit (i.e., output_signal[8]) and the accumulator step 404. Specifically, if the sign bit is 1 as determined in operation 454, then the calibration offset 408 is set to be the negative accumulator step 404 (i.e.,—accumulator step 404) in operation 456. Otherwise, the calibration offset 408 is set to be just the accumulator step 404 in operation 458. If the output_signal[7:0] is less than the accumulator step 404, then the BLC is terminated, and the calibration offset 408 is set to 0 in operation 460.

In one implementation, the calibration offset 408 is sent to a DAC to be converted to an analog signal, and the converted calibration offset 408 is then processed by a level integrator to generate a calibration signal. The DAC and the level integrator may correspond to the DAC 118 and the level integrator 120 shown in FIG. 1.

Figure 5A:
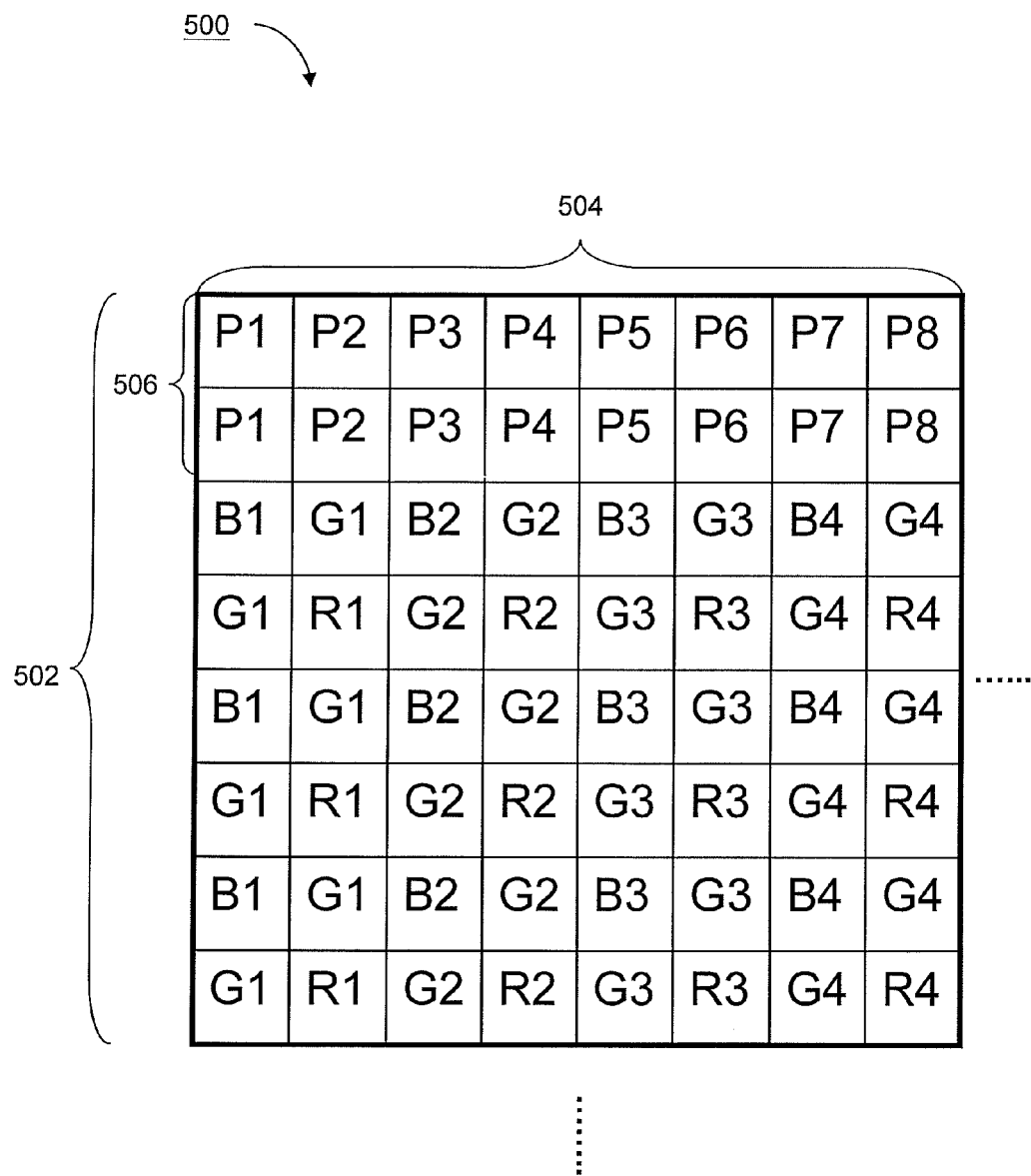
FIG. 5A is a schematic diagram of a sample image sensor, which includes a two-dimensional pixel array having multiple pixels arranged in rows and columns.

To further illustrate how the calibration signal may be generated and utilized in the calibration loop as discussed above and illustrated in FIG. 2, some example pixel values from a pixel array are selected to be processed by a BLC block, such as the BLC block 110 shown in FIG. 1. FIG. 5A is a schematic diagram of a sample image sensor 500, which includes a two-dimensional pixel array having multiple pixels arranged in rows 502 and columns 504. The image sensor 500 includes rows of black pixels 506. The black pixels 506 are designed to prevent light from reaching the light detection portion of the pixels. The image sensor 500 also includes rows of active pixels, such as red (R), green (G), and blue (B) pixels. Although the illustrated pixel array is regularly shaped, the array may have an arrangement different than what is illustrated (e.g., including more or less pixels, rows, and columns).

Figure 5B:
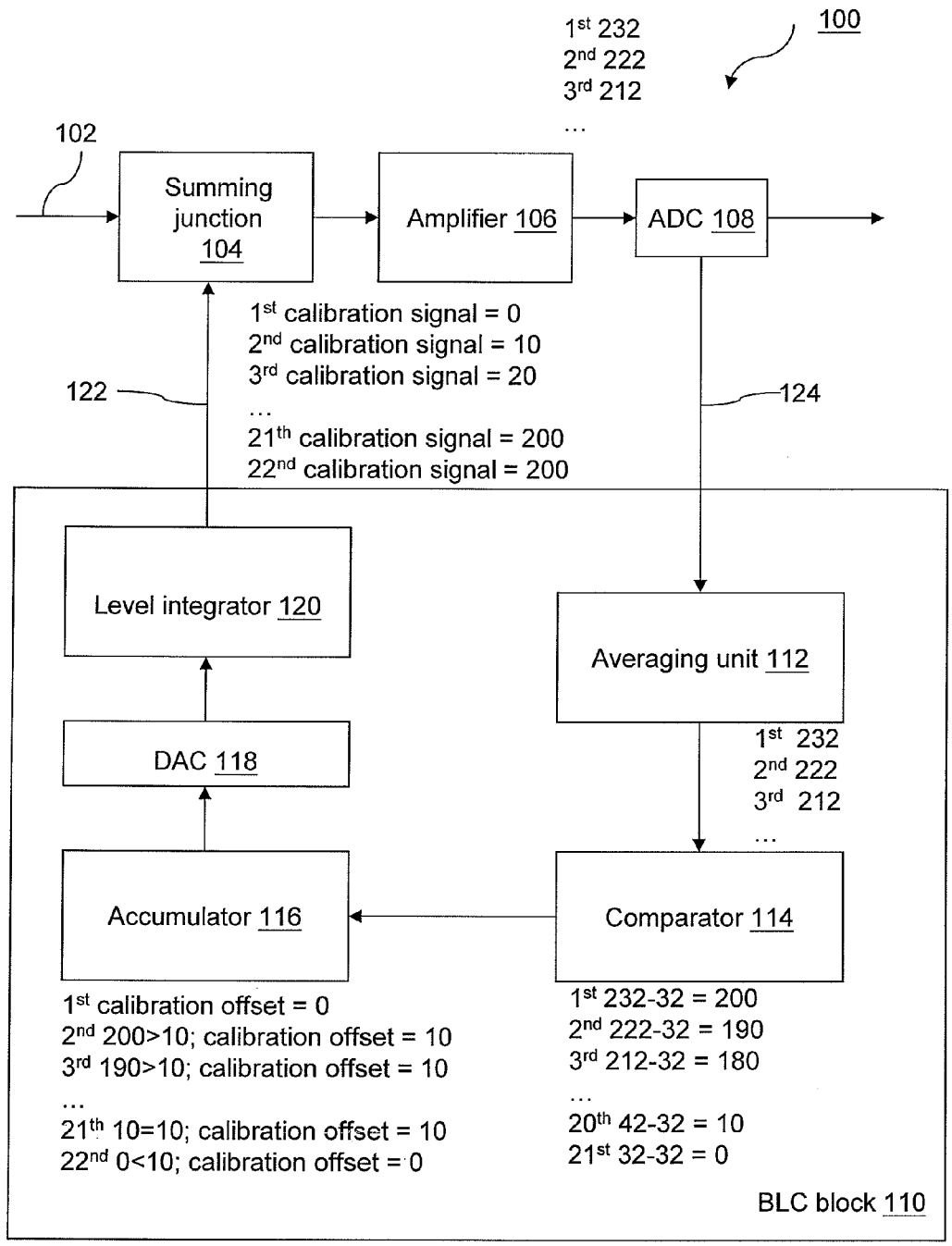
FIG. 5B illustrates an example BLC block annotated with example pixel values that correspond to different phases of the calibration loop in a frame, according to one embodiment of the present invention.

FIG. 5B illustrates an example BLC block annotated with example pixel values that correspond to different phases of the calibration loop in a frame, according to one embodiment of the present invention. Here, the example BLC block corresponds to the BLC block 110 of FIG. 1. Suppose all the black pixels shown in FIG. 5A have the same analog pixel value, which may correspond to a digital value of 232, and suppose further than the black pixels are being read out in time in a left-to-right sequence. In other words, P1 is read out first in time, and P2 is read out subsequent to the reading out of P1, and P3 is read out subsequent to the reading out of P2, and so on. Also, for simplicity and as an example, suppose the summing junction 104 is configured to apply the calibration signal 122 to four incoming pixels at a time; suppose the amplifier 106 scales the output of the summing junction 104 by a factor of 1; and the averaging unit 112 is configured to add and average four adjusted digital pixel values at a time. In addition, suppose the target black level is set to 32, the black level ceiling is set to 300, and the accumulator step is set to 10.

In the first iteration of the calibration loop, the accumulator 116 outputs an initial calibration offset of zero to the DAC 118 and the level integrator 120. In one implementation, the level integrator 120 generates a calibration signal by accumulating the received calibration offset. Although the calibration signal in one implementation is an analog signal, the analog calibration signal may correspond to one or more digital values. The one or more digital values are used below to illustrate the calibration loop. The calibration signal is zero in the first iteration, and the summing junction 104 applies this zero to the incoming pixel values of P1-P4, i.e., all at 232. When the averaging unit 112 receives the adjusted digital pixel values of P1-P4, i.e., still unchanged at 232, it calculates an average value of 232 for P1-P4 and sends the averaged value to the comparator 114. Because the difference between 232 and the target black level (i.e., 32) is 200, the target black level has not been reached. Also, because 200 is less than the black level ceiling of 300, the comparator 114 sends the output signal of 200 to the accumulator 116 for a second iteration of processing in the calibration loop.

Since 200 is greater than the accumulator step (i.e., 10), the calibration loop continues, and the calibration offset is set to be the accumulator step. The level integrator 120 generates the calibration signal of 10, and the summing junction 104 applies the calibration signal to a set of new incoming pixel values of P5-P8. Specifically, the pixel values of 232 are subtracted by 10. The adjusted digital pixel values of 222 for P5-P8 are processed by the averaging unit 112, and the averaged value of 222 is sent to the comparator 114. Similar to the first iteration, because the difference between 222 and the target black level (i.e., 32) is 190, the target black level has not been reached. Also, because 190 is less than the black level ceiling of 300, the comparator 114 sends the output signal of 190 to the accumulator 116 for a third iteration of processing in the calibration loop.

Since 190 is still greater than the accumulator step of 10, the calibration loop continues, and the accumulator 116 sets the calibration offset to be the accumulator step yet again. The level integrator 120 in this iteration generates the calibration signal of 20 by accumulating the received calibration offsets, and the summing junction 104 applies the calibration signal to another set of new incoming pixel values. Here, the pixel values of 232 are subtracted by 20.

In the $21^{st}$ iteration of the illustrated calibration loop, in which the output signal from the comparator 114 is equal to the accumulator step. The calibration signal of 200is applied to a set of new incoming pixel values, and the comparator 114 determines that the target black level of 32 is reached. In one implementation, after having reached the target black level, the calibration loop is terminated, and the calibration signal is applied to the other active pixels in the frame.

While the foregoing is directed to embodiments of the present invention, other and further embodiments of the present invention may be devised without departing from the basic scope thereof. For example, the illustrated image processing system may include separate components to handle different channels in parallel to improve image quality. In one implementation, the image processing system may include a first ADC and a second ADC. The first ADC may be configured to handle the blue and the red channels, and the second ADC may be configured to handle the green channel. Also, the resolution of the ADC (e.g., 10-bit resolution) may differ from the resolution of the DAC (e.g., 8-bit resolution) in the image processing system to reduce computation complexity. The above examples, embodiments, and drawings should not be deemed to be the only embodiments, and are presented to illustrate the flexibility and advantages of the present invention as defined by the following claims.

We claim:

1. A method for calibrating a black level signal in a frame, comprising:
  applying a first calibration signal to a first set of black level signals associated with a first set of black pixels of the frame to generate a first set of adjusted black level signals;
  averaging a first set of digital values corresponding to the first set of adjusted black level signals;
  determining whether a first average value based on the first set of digital values has reached a target black level;
  if the first average value has not reached the target black level, then proceeding to determine a first calibration offset based on an accumulator step and a first difference between the first average value and the target black level;
  converting the first calibration offset to an analog signal;
  generating a second calibration signal based on the analog signal;
  applying the second calibration signal to a second set of black level signals associated with a second set of black pixels of the frame to generate a second set of adjusted black level signals;
  averaging a second set of digital values corresponding to the second set of adjusted black level signals; and
  determining whether a second average value based on the second set of digital values has reached the target black level and whether to proceed to determine a second calibration offset, wherein the second calibration offset is determined based on the accumulator step and a second difference between the second average value and the target black level.

2. The method of claim 1, wherein the determining a first calibration offset is further based on a black level ceiling.

3. The method of claim 1, further comprising:
  converting the second calibration offset to a second analog signal; and
  including the analog signal in the second analog signal.

4. The method of claim 1, wherein the converting the first calibration offset further comprises receiving the first calibration offset in a first bit resolution and outputting the analog signal in a second bit resolution.

5. The method of claim 1, further comprising determining whether to terminate calibration for the frame based on a predetermined condition, wherein the predetermined condition corresponds to having processed all black pixels in the frame.

6. A black level calibration (BLC) block configured to iteratively process a black level signal in a frame, the BLC block comprises:
  an averaging unit configured to calculate a first average value for a first set of digital values corresponding to a first set of adjusted black level signals associated with a first set of black pixels of the frame, wherein the first set of adjusted black level signals are generated based on a first calibration signal generated by a level integrator;
  a comparator configured to determine whether the first average value has reached a target black level and generate a first output signal based on a first difference between the first average value and the target black level;
  an accumulator configured to determine a first calibration offset based on the first output signal and an accumulator step, if the first average value has not reached the target black level;
  a digital-to-analog converter (DAC) configured to convert the first calibration offset to an analog signal;
  the level integrator configured to generate a second calibration signal based on the analog signal;
  the averaging unit configured to calculate a second average value for a second set of digital values corresponding to a second set of adjusted black level signals associated with a second set of black pixels of the frame, wherein the second set of adjusted black level signals are generated based on the second calibration signal; and
  the comparator configured to determine whether the second average value has reached the target black level and whether to proceed to determine a second calibration offset, wherein the second calibration offset is determined based on the accumulator step and a second difference between the second average value and the target black level.

7. The BLC block of claim 6, wherein the comparator is further configured to compare the first difference between the first average value and the target black level to a black level ceiling in generating the first output signal for the accumulator.

8. The BLC block of claim 6, wherein the DAC is configured to convert the second calibration offset to a second analog signal, and the level integrator is configured to include the analog signal in the second analog signal.

9. The BLC block of claim 6, wherein the DAC is configured to receive the first calibration offset in a first bit resolution and output the analog signal in a second bit resolution.

10. The BLC block of claim 6, wherein the BLC block is configured to continue processing the black level signal in the frame until the BLC block has processed all black pixels in the frame.

11. An image processing system having a black level calibration (BLC) block configured to iteratively process a black level signal in a frame, the image processing system comprises:
  a summing junction configured to apply a first calibration signal from the BLC block to a first set of black level signals associated a first set of black pixels of the frame during a BLC period and generate a first set of adjusted black level signals;
  one or more analog-to-digital converters (ADCs) configured to convert the first set of adjusted black level signals to a first set of digital values; and
  the BLC block having
  an averaging unit configured to calculate a first average value for the first set of digital values;
  a comparator configured to determine whether the first average value has reached a target black level and generate a first output signal based on a first difference between the first average value and the target black level;
  an accumulator configured to determine a first calibration offset based on the first output signal and an accumulator step, if the first average value has not reached the target block level;
  a digital-to-analog converter (DAC) configured to convert the first calibration offset to an analog signal;
  a level integrator configured to generate a second calibration signal based on the analog signal for the summing junction to process a second set of black pixels of the frame;
  the averaging unit configured to calculate a second average value for a second set of digital values corresponding to a second set of adjusted black level signals associated with the second set of black pixels, wherein the second set of adjusted black level signals are generated based on the second calibration signal; and
  the comparator configured to determine whether the second average value has reached the target black level and whether to proceed to determine a second calibration offset, wherein the second calibration offset is determined based on the accumulator step and a second difference between the second average value and the target black level.

12. The image processing system of claim 11, wherein after the BLC block has met a predetermined condition and exited the BLC period, the summing junction is configured to apply a calibration signal generated by the BLC block to active pixels of the frame.

13. The image processing system of claim 11, wherein the comparator of the BLC block is further configured to compare the first difference between the first average value and the target black level to a black level ceiling in generating the first output signal for the accumulator.

14. The image processing system of claim 11, wherein the DAC is configured to convert the second calibration offset to a second analog signal, and the level integrator of the BLC block is configured to include the analog signal in the second analog signal.

15. The image processing system of claim 11, wherein the one or more ADCs are configured to generate the first set of digital values at a first bit resolution, and the DAC of the BLC block is configured to output the analog signal in a second bit resolution.

16. The image processing system of claim 12, wherein the predetermined condition corresponds to an average value for a set of black pixels in the frame having reached the target black level.

17. The image processing system of claim 11, wherein the predetermined condition corresponds to the BLC block having processed all black pixels in the frame.

18. The image processing system of claim 11, wherein the one or more ADCs are configured to independently handle distinct color channels of the frame.

* * * * *